(12) United States Patent
Kida et al.

(10) Patent No.: US 12,705,912 B2
(45) Date of Patent: Aug. 11, 2026

(54) IMAGE RECOGNITION DEVICE APPLYING TRANSFER LEARNING TO AN OBJECT RECOGNITION MODEL

(71) Applicant: JVCKENWOOD Corporation, Yokohama (JP)

(72) Inventors: Shingo Kida, Yokohama (JP); Hideki Takehara, Yokohama (JP); Yincheng Yang, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 318 days.

(21) Appl. No.: 18/324,195

(22) Filed: May 26, 2023

(65) Prior Publication Data

US 2023/0298366 A1 Sep. 21, 2023

Related U.S. Application Data

(63) Continuation of application No. PCT/JP2021/037156, filed on Oct. 7, 2021.

(30) Foreign Application Priority Data

Nov. 27, 2020 (JP) ................................ 2020-196991

(51) Int. Cl.
*G06V 20/70* (2022.01)
*G06V 10/74* (2022.01)
(Continued)

(52) U.S. Cl.
CPC ............ *G06V 20/70* (2022.01); *G06V 10/761* (2022.01); *G06V 10/774* (2022.01); *G06V 10/776* (2022.01); *G06V 10/82* (2022.01)

(58) Field of Classification Search
None
See application file for complete search history.

(56) References Cited

U.S. PATENT DOCUMENTS

2020/0184278 A1* 6/2020 Zadeh .................... G06N 3/044
2022/0319704 A1* 10/2022 Feng .................. G06V 10/7753
2024/0420316 A1* 12/2024 Rajanna ................ G06T 7/0012

FOREIGN PATENT DOCUMENTS

JP 2019212073 A * 12/2019
WO WO-2018005413 A1 * 1/2018 ........... G06V 10/764
(Continued)

OTHER PUBLICATIONS

Oquab, M.—"Learning and Transferring Mid-Level Image Representations using Convolutional Neural Networks"—CVPR 2014—pp. 1-8 (Year: 2014).*
(Continued)

*Primary Examiner* — Bernard Krasnic
(74) *Attorney, Agent, or Firm* — Shih IP Law Group, PLLC

(57) ABSTRACT

An object recognition unit recognizes an object in an input image by using an object recognition model. A recognition precision determination unit determines a precision of recognition of the object in the input image. A supervised image conversion unit converts the input image for which the precision of recognition of the object is lower than a predetermined threshold value into a supervised image by labeling the input image based on a feature amount of the input image. A transfer learning unit applies transfer learning to the object recognition model by using the supervised image as training data to update the object recognition model.

3 Claims, 5 Drawing Sheets

(51) Int. Cl.

| | |
|---|---|
| ***G06V 10/774*** | (2022.01) |
| ***G06V 10/776*** | (2022.01) |
| ***G06V 10/82*** | (2022.01) |

(56) References Cited

FOREIGN PATENT DOCUMENTS

| | | | | |
|---|---|---|---|---|
| WO | WO2019003355 A1 | | 1/2019 | |
| WO | WO-2019229117 A1 | * | 12/2019 | ........... G06N 3/0895 |
| WO | WO-2020163455 A1 | * | 8/2020 | ......... G05B 13/0265 |
| WO | WO-2022056515 A2 | * | 3/2022 | ............. G06N 3/045 |

OTHER PUBLICATIONS

International Search Report from International Application No. PCT/JP2021/037156 mailed Dec. 28, 2021, 4 pages.

International Preliminary Report on Patentability from from International Application No. PCT/JP2021/037156 mailed May 30, 2023, 8 pages.

European Extended Search Report from EP Application No. 21897513.4 mailed Feb. 20, 2024, 8 pages.

Mohamed Alipour, et al., "A Big Data Analytics Strategy for Scalable Urban Infrastructure Condition Assessment Using Semi-Supervised Multi-Transform Self-Training", Journal of Civil Structural Health Monitoring, Springer Berlin Heidelberg, Berlin/Heidelberg, vol. 10, No. 2, Mar. 2, 2020, pp. 313-332.

* cited by examiner

100
IMAGE RECOGNITION DEVICE
10
INPUT UNIT
20
OBJECT RECOGNITION UNIT
40
RECOGNITION PRECISION DETERMINATION UNIT
50
OUTPUT UNIT
30
OBJECT RECOGNITION STORAGE UNIT
LOW RECOGNITION PRECISION IMAGE
80
TRANSFER LEARNING UNIT
LABELED IMAGE
60
SUPERVISED IMAGE CONVERSION UNIT
FEATURE AMOUNT
LABEL
70
FEATURE AMOUNT-LABEL DATABASE
90
PRIOR LEARNING DATA SET STORAGE UNIT

FIG. 4

BICYCLE

IMAGE RECOGNITION DEVICE APPLYING TRANSFER LEARNING TO AN OBJECT RECOGNITION MODEL

CROSS REFERENCE TO RELATED APPLICATION

This application is a continuation of application No. PCT/JP2021/037156, filed on Oct. 7, 2021, and claims the benefit of priority from the prior Japanese Patent Application No. 2020-196991, filed on Nov. 27, 2020, the entire content of which is incorporated herein by reference.

BACKGROUND OF THE INVENTION

1. Field of the Invention

The present invention relates to image recognition technologies.

2. Description of the Related Art

In a device for recognizing an object in an image, an image for which the recognition precision is low is categorized as an unknown image for which recognition is difficult. Manual annotation of having humans identify an intra-image object in an unknown image and label the image is performed.

Patent document 1 discloses a system for acquiring an unknown image for which a trained model has not been created yet, selecting a model trained for known images similar to the acquired unknown image in respect of imaging conditions from among trained models, applying image analysis to the unknown image by using the selected trained model, and providing a result of image analysis.

[Patent literature 1] WO2019/003355

Manual annotation has a disadvantage in that it requires a lot of time and cost and so is impractical.

SUMMARY OF THE INVENTION

The present disclosure addresses the issue described above, and a purpose thereof is to provide an image recognition technology capable of recognizing an unknown image with a high precision.

An image recognition device according to an aspect of the embodiment includes: an object recognition unit that recognizes an object in an input image by using an object recognition model; a recognition precision determination unit that determines a precision of recognition of the object in the input image; a supervised image conversion unit that converts the input image for which the precision of recognition of the object is lower than a predetermined threshold value into a supervised image by labeling the input image based on a feature amount of the input image; and a transfer learning unit that applies transfer learning to the object recognition model by using the supervised image as training data to update the object recognition model.

Another aspect of the embodiment relates to an image recognition method. The method includes: recognizing an object in an input image by using an object recognition model; determining a precision of recognition of the object in the input image; converting the input image for which the precision of recognition of the object is lower than a predetermined threshold value into a supervised image by labeling the input image based on a feature amount of the input image; and applying transfer learning to the object recognition model by using the supervised image as training data to update the object recognition model.

Still another aspect of the embodiment relates to a non-transitory computer-readable recording medium having embodied thereon an object recognition model. The object recognition model is an object recognition model that causes a computer to recognize an object in an input image, wherein the object recognition model is updated by being subjected to transfer learning by using, as training data, a supervised image derived from labeling the input image, for which a precision of recognition of the object is lower than a predetermined threshold value, based on a feature amount of the input image.

Optional combinations of the aforementioned constituting elements, and implementations of the embodiment in the form of methods, apparatuses, systems, recording mediums, and computer programs may also be practiced as additional modes of the present disclosure.

BRIEF DESCRIPTION OF THE DRAWINGS

FIG. 4 shows a supervised image derived from labeling an unknown image;

DETAILED DESCRIPTION OF THE INVENTION

The invention will now be described by reference to the preferred embodiments. This does not intend to limit the scope of the present invention, but to exemplify the invention.

Figure 1:
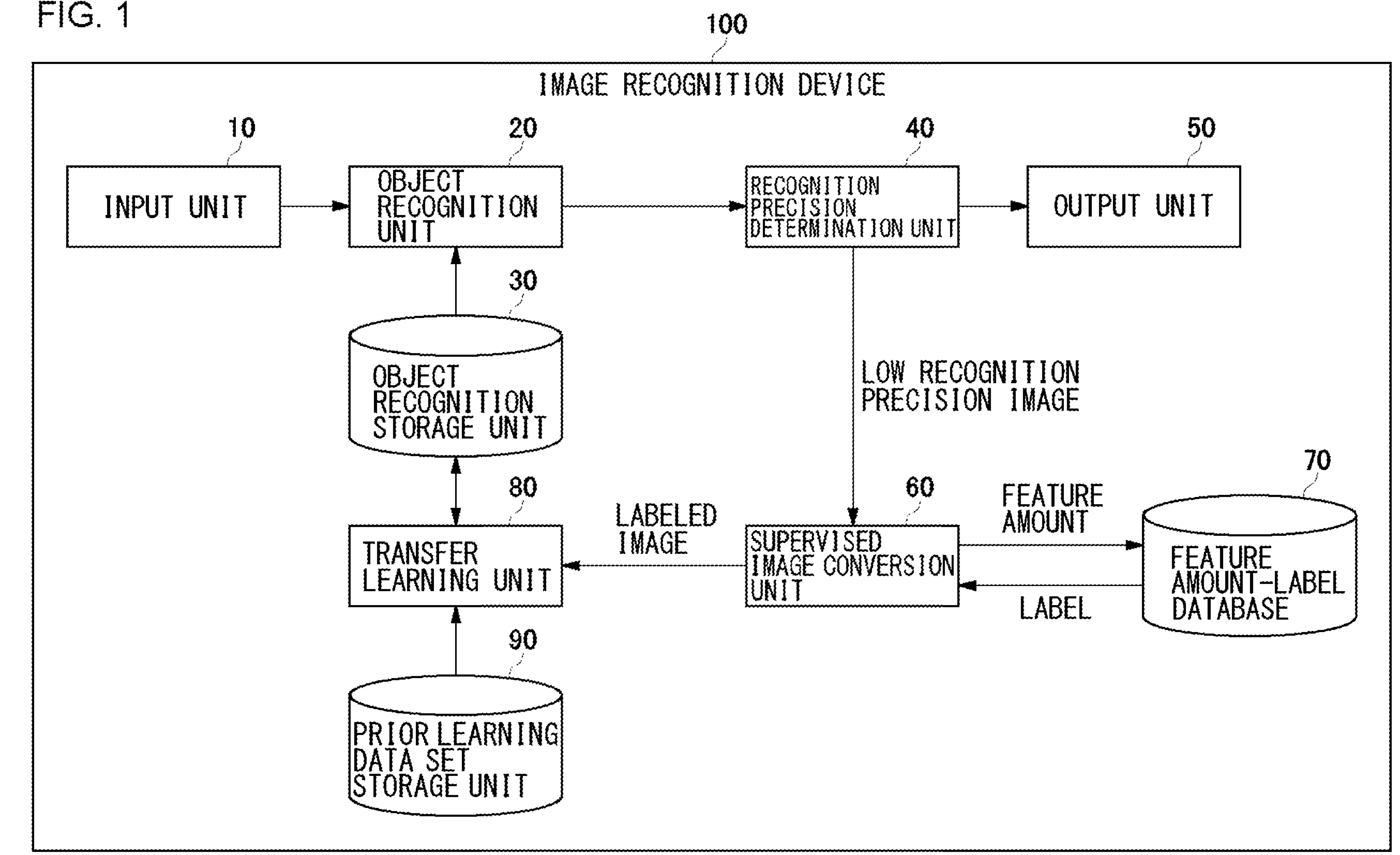
FIG. 1 shows a configuration of an image recognition device according to the embodiment.

FIG. 1 shows a configuration of an image recognition device 100 according to the embodiment. The image recognition device 100 includes an input unit 10, an object recognition unit 20, an object recognition model storage unit 30, a recognition precision determination unit 40, an output unit 50, a supervised image conversion unit 60, a feature amount-label database 70, a transfer learning unit 80, and a prior learning data set storage unit 90.

The input unit 10 acquires an image in which an object should be recognized and supplies the image to the object recognition unit 20.

The object recognition model storage unit 30 stores an object recognition model trained by a prior learning data set and having an excellent recognition precision. The prior learning data set storage unit 90 stores the prior learning data set used in training the object recognition model.

The object recognition unit 20 uses the trained object recognition model stored in the object recognition model storage unit 30 to recognize an object in the input image. The object recognition unit 20 supplies a result of recognition of an object in the input image to the recognition precision determination unit 40.

When the precision of recognition of the object by the object recognition unit 20 is equal to or higher than a predetermined threshold value, the result of recognition is supplied to the output unit 50. The output unit 50 outputs the result of recognition in the input image. The result of recognition includes at least one candidate object class and a recognition precision thereof.

The recognition precision determination unit 40 determines the precision of recognition of the object in the input image and supplies a low recognition precision image for which the precision of recognition of the object is lower than the predetermined threshold value to the supervised image conversion unit 60 as an unknown image.

The supervised image conversion unit 60 converts the unknown image supplied from the recognition precision determination unit 40 into a supervised image by labeling the unknown image based on the feature amount of the unknown image and supplies the supervised image to the transfer learning unit 80. The feature amount in an intermediate layer toward the end of the neural network, which is an intermediate output yielded when an image is input to the trained object recognition model stored in the object recognition model storage unit 30, may be used, by way of one example, as the feature amount used to label the unknown image.

The feature amount-label database 70 is a database that stores pairs each comprised of a feature amount of the image and a label. The supervised image conversion unit 60 refers to the feature amount-label database 70 to acquire a label corresponding to the feature amount most similar to the feature amount of the unknown image, and converts the unknown image to the supervised image by attaching the acquired label to the unknown image. A database that maps the feature amount in an intermediate layer toward the end of the neural network, which is an intermediate output provided when an image is input to the trained object recognition model stored in the object recognition model storage unit 30, to the label of the image may be used, by way of one example, as the feature amount-label database.

The transfer learning unit 80 adds the supervised image supplied from the supervised image conversion unit 60 to the prior learning data set stored in the prior learning data set storage unit 90 to configure a new data set, applies transfer learning to the object recognition model by using the new data set, and stores the updated object recognition model in the object recognition model storage unit 30.

In the case a data set such as big data used in the prior learning in the object recognition model can be used, that data set is stored the prior learning data set in the prior learning data set storage unit 90. In the case the data set used in the prior learning in the object recognition model cannot be used, known input images in which an object is recognized by the object recognition unit 20 with a high precision may be stored as the prior learning data set. In this case, the transfer learning unit 80 adds the supervised image derived from labeling the unknown image to the prior learning data set of known images stored in the prior learning data set storage unit 90 to configure a new data set and applies transfer learning to the object recognition model by using the new data set.

In transfer learning, the final output layer in a neural network of a trained model is replaced by a new layer and a new neural network is created by re-training parameters of the new layer by using the new data set as training data, by way of one example.

Even when an image including an object for which the recognition precision has been low is input, the object recognition unit 20 can recognize that object with a high precision by using the updated object recognition model. This makes it possible to recognize an object of an unknown class.

Figure 2A:
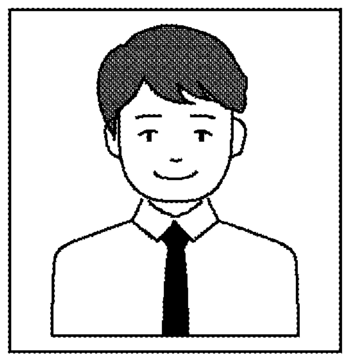
FIGS. 2A-2D show exemplary images input to the object recognition unit of FIG. 1.
Figure 2B:
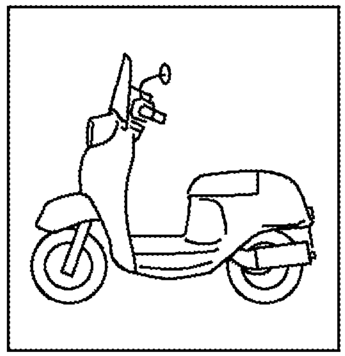
Figure 2C:
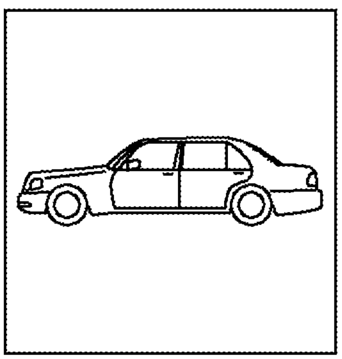
Figure 2D:
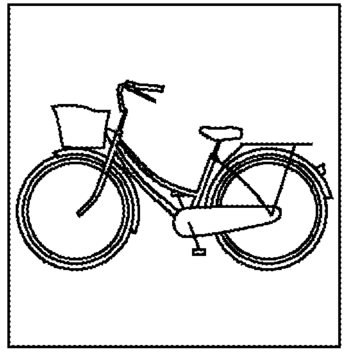

FIGS. 2A-2D show exemplary images input to the object recognition unit 20. FIG. 2A shows an image of a person, FIG. 2B shows an image of a motorbike, FIG. 2C shows an image of a car, and FIG. 2D shows an image of a bicycle. It will be assumed that there are other types of input images. For example, it will be assumed that that there are a total of 10 types.

It will be assumed that the initial object recognition model was trained by using three types of images as prior data set because a large number of images of three types, i.e., persons, motorbikes, and cars are available.

FIGS. 3A-3D show results of recognition of objects in the images of FIGS. 2A-2D by the object recognition unit 20 based on the trained object recognition model.

Figure 3A:
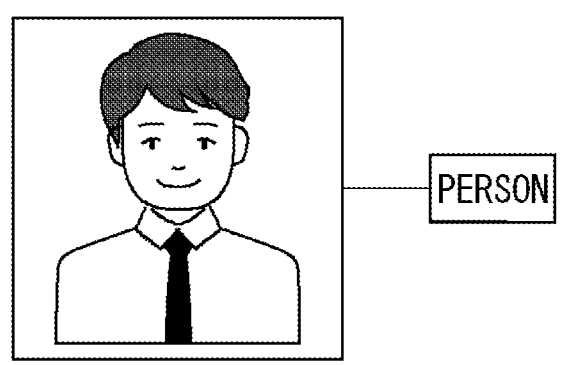
FIGS. 3A-3D show results of recognition of objects in the images of FIGS. 2A-2D by the object recognition unit of FIG. 1 based on the trained object recognition model.
Figure 3B:
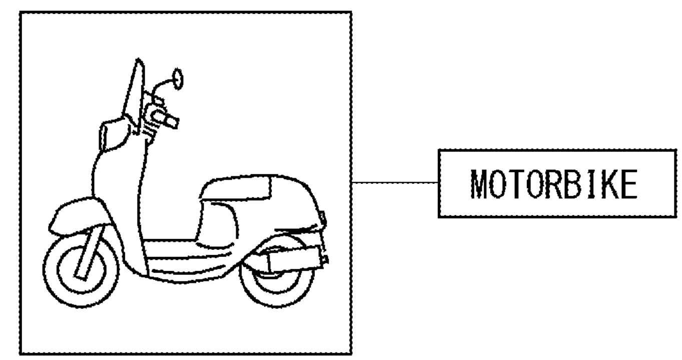
Figure 3C:
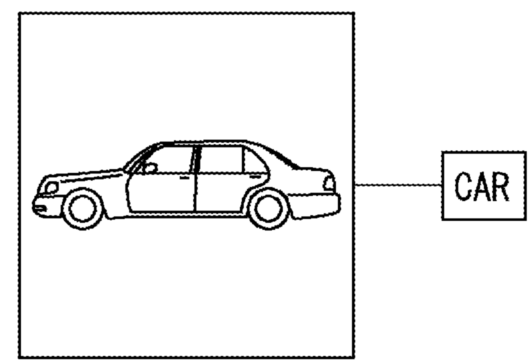
Figure 3D:
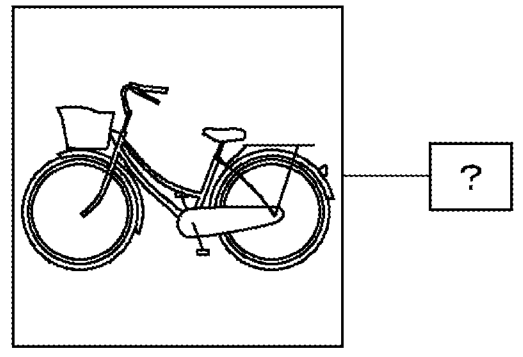

The initial object recognition model has been trained in advance for three classes, i.e., persons, motorbikes, and cars and so yields recognition results such that the image of FIG. 2A is labeled "person" as shown in FIG. 3A, the image of FIG. 2B is labeled "motorbike" as shown in FIG. 3B, and the image of FIG. 2C is labeled "car" as shown in FIG. 3C. However, the initial object recognition model is not trained to learn a class "bicycle". Therefore, as shown in FIG. 3D, the result of recognition of the image of FIG. 2D has a low precision, and an "unknown" label is attached.

The supervised image conversion unit 60 extracts the feature amount of the image of FIG. 2D, refers to the feature amount-label database 70, and acquires a label corresponding to the feature amount most similar to the feature amount of the image of FIG. 2D. In this case, the label acquired is "bicycle". The supervised image conversion unit 60 converts the image of FIG. 2D into a supervised image by attaching, as shown in FIG. 4, the label "bicycle" acquired from the feature amount-label database 70 to the image.

Figure 4:
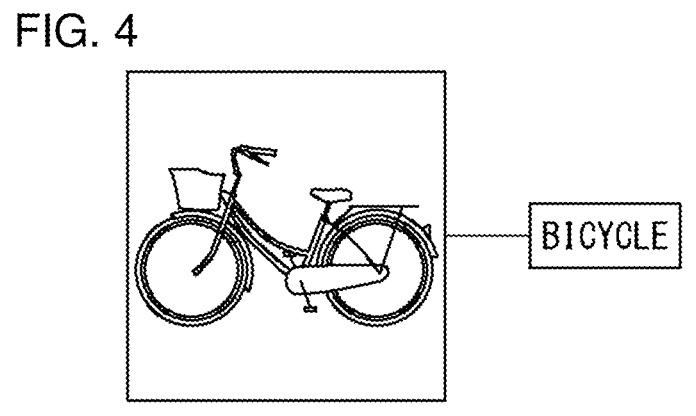

The transfer learning unit 80 applies transfer learning to the object recognition model by using the supervised image of FIG. 4 as new training data to create a new object recognition model. This makes it possible for the new object recognition model to recognize four classes, i.e., persons, motorbikes, cars, and bicycles. In this manner, it is made possible to recognize all of 10 classes by converting, every time an unknown image for which the recognition precision is low is detected, the image into a labeled supervised image, and applying transfer learning to the object recognition model by using the supervised image as new training data.

It should be noted here that, if transfer learning is applied to the object recognition model only by using, as training data, a supervised image derived from labeling an image of an unknown class, it might be impossible to properly recognize an image of a known class, which has been recognized so far. It is therefore preferred to apply transfer learning to the object recognition model by using, as training data, a new data set derived from adding a supervised image of an unknown class to a supervised image of a known class. When transfer learning is performed by using an image of a bicycle, for example, a new data set is configured by adding a supervised image of a bicycle to a prior learning data set of supervised images of persons, motorbikes, and cars, and transfer learning is applied to the object recognition model by using the data set including four types of supervised images as training data. This makes it possible to ultimately create an object recognition model capable of recognizing all types of images properly.

Figure 5:
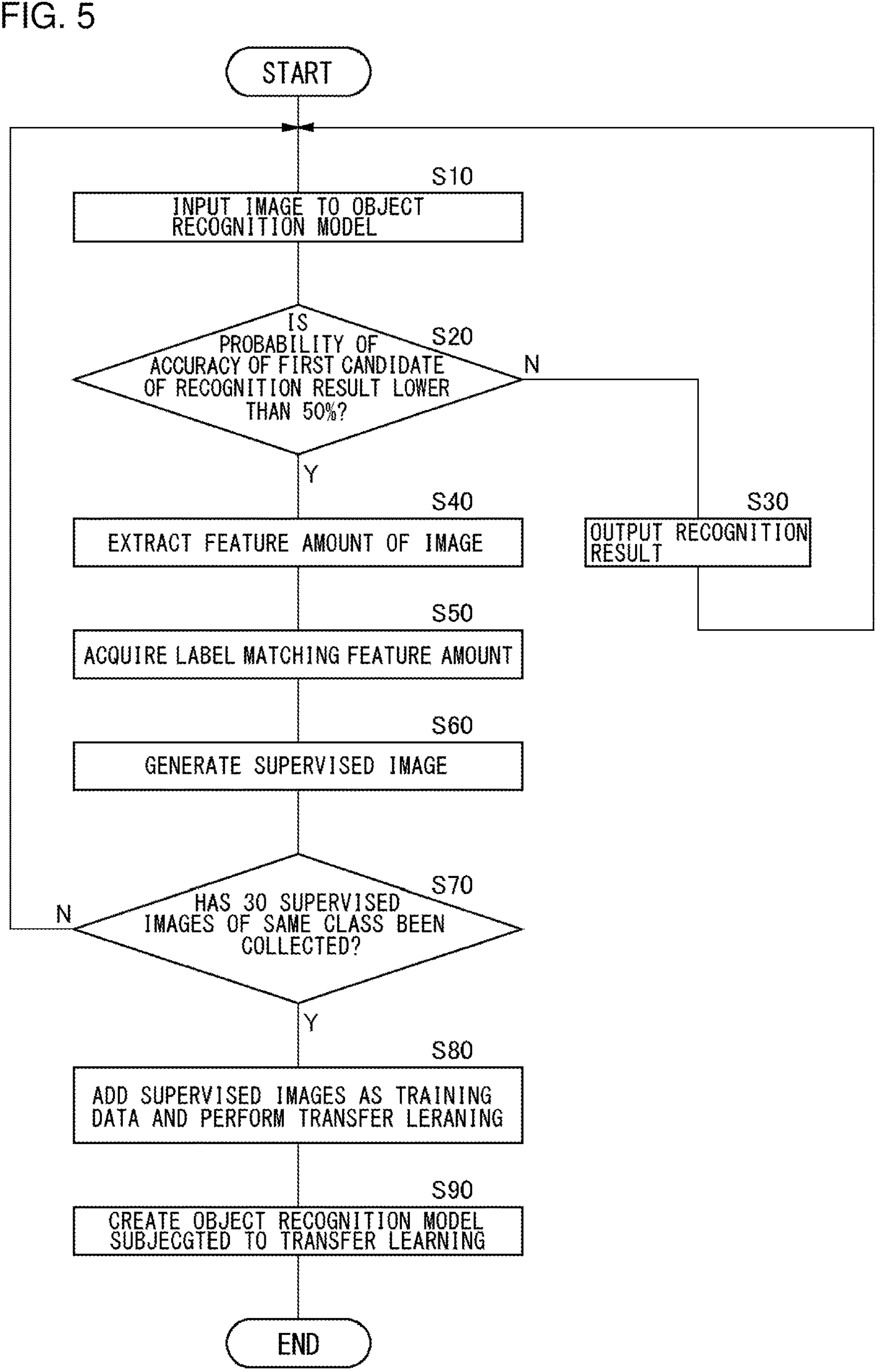
FIG. 5 is a flowchart showing a sequence of image recognition steps performed by the image recognition device of FIG. 1.

FIG. 5 is a flowchart showing a sequence of image recognition steps performed by the image recognition device 100.

The object recognition unit 20 inputs an image subject to recognition to the object recognition model and recognizes an object in the image (S10).

When the precision of recognition of the object is equal to or higher than a predetermined threshold value (N in S20), a label of a recognition result is output (S30). Control is returned to step S10, and another image is input.

When the precision of recognition of an object is lower than the predetermined threshold value, and, for example, when the probability of accuracy of the first candidate label is lower than 50% (Y in S20), the input image is dealt with as an unknown image, and the feature amount of the image is extracted accordingly (S40).

The supervised image conversion unit 60 acquires a label that matches the feature amount of the unknown image from the feature amount-label database 70 (S50) and generates a supervised image by attaching the acquired label to the unknown image (S60).

The steps from step S10 through step S60 are repeated until a predetermined number of (e.g., 30) supervised images of objects of the same class are collected (N in S70). When a predetermined number of (in this case, 30) supervised images of the same class are collected (Y in S70), the transfer learning unit 80 adds the predetermined number of supervised images to the data set used in the prior learning to create a new data set, and applies transfer learning to the trained object recognition model by using the new data set (S80). The transfer learning unit 80 generates a new object recognition model subjected to transfer learning and stores the new object recognition model in the object recognition model storage unit 30 (S90).

In the above description, transfer learning is performed after a predetermined number of supervised images of objects of the same class are collected. Alternatively, transfer learning may be performed every time one supervised image is generated.

The above-described various processes in the image recognition device 100 can of course be implemented by hardware-based devices such as a CPU and a memory and can also be implemented by firmware stored in a read-only memory (ROM), a flash memory, etc., or by software on a computer, etc. The firmware program or the software program may be made available on, for example, a computer readable recording medium. Alternatively, the program may be transmitted and received to and from a server via a wired or wireless network. Still alternatively, the program may be transmitted and received in the form of data broadcast over terrestrial or satellite digital broadcast systems.

In the related configuration, it has been necessary to annotate an unknown image manually and to add an annotated image as training data for transfer learning. The image recognition device 100 of the embodiment detects an unknown image for which the recognition precision is low, based on the result of recognition by a trained object recognition model. The unknown image is automatically converted into a supervised image, the post-conversion supervised image is added as new training data, and a part of the trained object recognition model is re-trained. This makes it possible to recognize an unknown image with a high precision without resorting to a manual job.

The present invention has been described above based on an embodiment. The embodiment is intended to be illustrative only and it will be understood by those skilled in the art that various modifications to combinations of constituting elements and processes are possible and that such modifications are also within the scope of the present invention.

What is claimed is:

1. An image recognition device comprising:

an object recognition unit that recognizes an object in an input image by using an object recognition model;

a recognition precision determination unit that determines a precision of recognition of the object in the input image;

a supervised image conversion unit that converts the input image for which the precision of recognition of the object is lower than a predetermined threshold value into a supervised image by labeling the input image based on a feature amount of the input image; and a transfer learning unit that applies transfer learning to the object recognition model by using the supervised image as training data to update the object recognition model; and a database that maps a feature amount in an intermediate layer toward an end of a neural network, which is an intermediate output provided when the input image is input to the object recognition model, to a label of the input image, wherein the supervised image conversion unit refers to the database to acquire a label corresponding to a feature amount most similar to the feature amount of the input image and automatically converts the input image to the supervised image by attaching the acquired label to the input image for which the precision of recognition of the object is lower than the predetermined threshold value, and outputs the label of a recognition result of the input image for which the precision of recognition of the object is equal to or higher than the predetermined threshold value, wherein the transfer learning unit adds the supervised image to a data set used in prior learning of the object recognition model to configure a new data set and applies transfer learning to the object recognition model by using the new data set as training data, and wherein when a predetermined number of supervised images having the same label are collected, the transfer learning unit adds the supervised images to the data set used in the prior learning of the object recognition model to create the new data set.

2. An image recognition method comprising:

recognizing an object in an input image by using an object recognition model;

determining a precision of recognition of the object in the input image;

converting the input image for which the precision of recognition of the object is lower than a predetermined threshold value into a supervised image by labeling the input image based on a feature amount of the input image;

applying transfer learning to the object recognition model by using the supervised image as training data to update the object recognition model; and referring to a database that maps a feature amount in an intermediate layer toward an end of a neural network, which is an intermediate output provided when the input image is input to the object recognition model, to a label of the input image, wherein the converting refers to the database to acquire a label corresponding to a feature amount most similar to the feature amount of the input image and automatically converts the input image to the supervised image by attaching the acquired label to the input image for which the precision of recognition of the object is lower than the predetermined threshold value, and outputs the label of a recognition result of the input image for which the precision of recognition of the object is equal to or higher than the predetermined threshold value, wherein the applying transfer learning adds the supervised image to a data set used in prior learning of the object recognition model to configure a new data set and applies transfer learning to the object recognition model by using the new data set as training data, and wherein when a predetermined number of supervised images having the same label are collected, the applying transfer learning adds the supervised images to the data set used in the prior learning of the object recognition model to create the new data set.

3. A non-transitory computer-readable recording medium having embodied thereon an image recognition program that causes a computer to perform:

recognizing an object in an input image by using an object recognition model;

determining a precision of recognition of the object in the input image;

converting the input image for which the precision of recognition of the object is lower than a predetermined threshold value into a supervised image by labeling the input image based on a feature amount of the input image;

applying transfer learning to the object recognition model by using the supervised image as training data to update the object recognition model; and referring to a database that maps a feature amount in an intermediate layer toward an end of a neural network, which is an intermediate output provided when the input image is input to the object recognition model, to a label of the input image, wherein the converting refers to the database to acquire a label corresponding to a feature amount most similar to the feature amount of the input image and automatically converts the input image to the supervised image by attaching the acquired label to the input image for which the precision of recognition of the object is lower than the predetermined threshold value and outputs the label of a recognition result of the input image for which the precision of recognition of the object is equal to or higher than the predetermined threshold value, wherein the applying transfer learning adds the supervised image to a data set used in prior learning of the object recognition model to configure a new data set and applies transfer learning to the object recognition model by using the new data set as training data, and wherein when a predetermined number of supervised images having the same label are collected, the applying transfer learning adds the supervised images to the data set used in the prior learning of the object recognition model to create the new data set.

* * * * *